United States Patent
Fukunaga et al.

(10) Patent No.: US 6,198,179 B1
(45) Date of Patent: Mar. 6, 2001

(54) LINEAR ACTUATOR

(75) Inventors: Shigeki Fukunaga, Yokaichi; Takeshi Hashimoto, Shiga-ken; Shigeru Tsuji, Omihachiman, all of (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/250,409

(22) Filed: Feb. 16, 1999

(30) Foreign Application Priority Data

Feb. 16, 1998 (JP) .................................................. 10-051340
Jan. 25, 1999 (JP) .................................................. 11-015073

(51) Int. Cl.[7] .................................................. H02K 41/00
(52) U.S. Cl. .................................................. 310/12; 310/17
(58) Field of Search .................................................. 310/12, 13, 14, 310/15, 17, 20, 21, 23

(56) References Cited

U.S. PATENT DOCUMENTS 5,309,050 * 5/1994 Morinigo et al. .................. 310/14
5,521,446 * 5/1996 Chalupa .................. 310/12

* cited by examiner

Primary Examiner—Nestor Ramirez
Assistant Examiner—Judson H. Jones
(74) Attorney, Agent, or Firm—Burns, Doane, Swecker & Mathis, LLP

(57) ABSTRACT

A linear actuator can obtain a roughly fixed load within a stroke range. The linear actuator comprises a fixed element, comprising a yoke and a magnet which is magnetized in the radial direction, and a moving element, comprising an electromagnetic coil and a bobbin which surrounds the magnet. A spring is provided for applying a force acting in opposition to the thrust direction acting on the moving element. A constant load stroke area is provided so that the characteristics of the opposite force of this spring balance the characteristics of the thrust force acting on the moving element. The constant load stroke area is an area where one end of the coil in the stroke direction is located in an outside position from one end of the magnet in the stroke direction, and the other end of the coil in the stroke direction is located in an inside position from both ends of the magnet in the stroke direction.

12 Claims, 6 Drawing Sheets

LINEAR ACTUATOR

This application corresponds to Japanese Patent Application No. 10-51340, filed on Feb. 16, 1998, which is hereby incorporated by reference in its entirety. This application also corresponds to Japanese Patent Application No. 11-15073, filed on Jan. 25, 1999, which is also hereby incorporated by reference in its entirety

BACKGROUND OF THE INVENTION

1. Field of the Invention

The present invention relates to a small-scale linear actuator for exemplary use in a process for component mounting and measuring or the like, such as a process for mounting and measuring a chip component using a probe.

2. Description of the Related Art

Generally, a linear actuator comprises a fixed element and a moving element. For instance, the fixed element can comprise a yoke and a magnet, and the moving element can comprise a bobbin and an electromagnetic coil. When current is injected into the coil, the action of the magnetic field and the current produces thrust on the moving element. As a result, the moving element moves in the direction of the thrust while maintaining a very small gap between the moving element and the fixed element. When the direction of current flow is reversed, the thrust is reversed. By using a lightweight moving element and appropriately controlling the electrical current, it is possible to achieve excellent responsiveness and precise position control.

It is preferable that the acting force (thrust) of the actuator to an outside is constant within a movable stroke area in case of a mounting process or an inspection process. However, in the configuration described above, the magnetic flux acting on the coil varies depending on the position of the moving element, and consequently, the resultant force acting on the actuator also varies within the stroke range.

In order to make the thrust of the actuator constant, the length of the magnet in the stroke direction may be lengthened so that the coil can move within a constant magnetic flux area of the magnet. However, in this structure, when power is switched off due to an emergency shutdown or the like, thrust is lost and the moving element stops in a position other than the desired position. In particular, when the linear actuator is used as a Z-axis actuator in the process of mounting and measuring or the like, there is a possibility that a dead load will cause the moving element to drop below the lower limit of the stroke, thereby causing damage to the device or product, or causing injury to the operator. Thus, the fact that the actuator stops in a position not intended by the designer gives rise to problems of safety and product quality.

Furthermore, when the actuator remains stationary in one place for a long time due to malfunction or while waiting for items to be processed, heat is generated in the actuator, leading to problems of poor performance and shortened life span.

SUMMARY OF THE INVENTION

Accordingly, it is an object of the present invention to provide a linear actuator wherein a fixed load can be obtained within the stroke range and at least the problems mentioned above can be solved or reduced.

In order to achieve the above objects, a first aspect of the present invention comprises a linear actuator comprising a fixed element located at a fixed position, a moving element provided movable in the straight line direction, a coil provided with one of the fixed element and the moving element, and a magnet provided with the other of the fixed element and the moving element. The magnet generates the magnetic flux in vertical direction to the coil. The linear actuator also comprises means for applying opposing force to a thrusting force applied to the moving element. The means has a predetermined reaction characteristic in the stroke direction of the moving element. The present invention provides a linear actuator wherein a constant load stroke area is provided in at least a part of stroke area of the moving element so that the reaction characteristic of the means and the thrusting force applied to the moving element are balanced.

The present invention is characterized in that the force applying means (for instance, a spring) is provided which has the reaction force opposing to the thrust of the moving element. However, when the actuator is activated and the position of the moving element changes, the opposite force from the force applying means also changes, so that the resultant load which the actuator applies to the outside is different. Therefore, according to the present invention, balance is ensured between the characteristics of the opposite force of the force applying means and the characteristics of the thrust acting on the moving element, thereby achieving a constant load to the outside within the stroke range.

As in the second aspect of the present invention, it is preferable that a cylindrical magnet magnetized in a radial direction defined by a yoke is provided with one of the fixed element and the moving element, a cylindrical coil is provided with the other of the fixed element and the moving element in a concentric circle at inner or outer peripheral side of the cylindrical magnet, and the moving element is movable in the axial direction of the cylindrical magnet. In this case, since the magnetic flux of the magnet functions over the whole periphery, enabling to generate a large thrust force by a small current.

As shown in FIG. 1, when the density distribution of the magnetic flux is constant as in the third aspect of the present invention, it is preferable that a constant load stroke area is in an area where one end of the coil in the stroke direction is located at an outside position from one end c of the magnet in the stroke direction, and the other end b of the coil in the stroke direction is located at an inside position from both ends, c, d of the magnet in the stroke direction. In such a case, when the reaction force of the force applying means is made to vary with a constant inclination in accordance with the variation of the coil, the thrust applied to the coil is increased in proportion. Thus, the thrust and the reaction force are cancelled, thereby making the load to outside constant.

In general, the magnetic flux distribution is not always constant. As shown in FIG. 2, there is a case having an area, whose magnetic flux distribution is not constant, at both ends thereof. According to a fourth aspect of the present invention, a constant load stroke area is determined in an area where one end of the coil in the stroke direction is located in the outside end b of the coil in the stroke direction is located within a substantially constant area c' to d' of the magnetic flux of the magnet. Namely, the thrust applied to the coil can be vary in proportion by preventing both ends of the coil from moving in the area whose magnetic flux is not constant.

When a constant load stroke area includes a pair of a coil and a magnet, the constant load stroke area is limited by a dimension of the coil in the stroke direction. According to a fifth aspect of the present invention, a first and a second coil, a first and a second magnets which generate a magnetic flux in the vertical direction to the coils, are provided. The first coil and the second coil, and the first magnet and the second magnet are mutually connected with a predetermined interval therebetween, so that when one end of the first coil in the stroke direction is at an outside position from one end of the first magnet in the stroke direction and the other end of the first coil is at an inside position from both ends of the first magnet in the stroke direction, both ends of the second coil in the stroke direction are at an outside position from both ends of the second magnet in the stroke direction, and when both ends of the first coil in the stroke direction are at an inside position from both ends of the first coil in the stroke direction, one end of the second coil in the stroke direction is at an outside position from one end of the second magnet in the stroke direction and the other end of the second coil is at an inside position from both ends of the second magnet in the stroke direction.

Namely, while the first coil moves within the constant load stroke area with respect to the first magnet, the second coil moves within an area where the thrust to the first magnet is not generated. While the first coil moves within an area where the thrust to the first magnet is constant, the second coil moves within the constant load stroke area with respect to the second magnet. Due to that, a plurality of constant load stroke areas can be connected, thereby enlarging the constant load stroke areas.

According to a sixth aspect of the present invention, as in the fourth aspect, when the magnetic flux of both ends of the magnet is not constant, an end of the coil is prevented from moving within an area where the magnetic flux is not constant. Thus, the thrust applied to the coils can be changed in proportion.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENT

Figure 3:
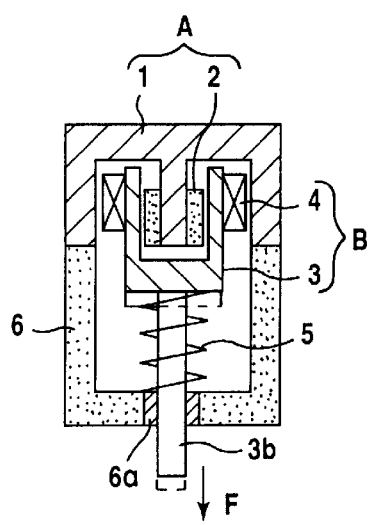
FIG. 3 is an overall cross-sectional view of an example of a linear actuator according to the present invention.

FIG. 3 shows an example of a linear actuator according to the present invention applied in a Z-axis actuator.

In FIG. 3, the linear actuator comprises a fixed element A, comprising a yoke 1 and a permanent magnet 2. The actuator also comprises a moving element B, comprising a bobbin 3 and an electromagnetic coil 4, and a spring 5 which is a force applying means or the like. The yoke 1 is secured to a chassis 6.

The yoke 1 is substantially cylindrical, having in its center a central magnetic electrode 1b projecting downwards from an upper wall 1a (e.g., "downwards" meaning a direction away from the wall 1a), and a cylindrical external magnetic electrode 1c provided around the perimeter of the yoke 1 and projecting downwards. The bottom end of the external magnetic electrode 1c extends down beyond the end of the central magnetic electrode 1b. The magnet 2 is cylindrical and is secured around the perimeter of the central magnetic electrode 1b. The magnet 2 is magnetized in the radial direction, so that, for instance, its radially inner face forms an N electrode and its radially outer face forms an S electrode. The top end face of the magnet 2 is located at a fixed distance below the top wall 1a of the yoke 1. When the magnet 2 is secured to the central magnetic electrode 1b in the manner described above, a magnetic circuit is formed. The magnetic "loop" is formed by the magnet 2, the central magnetic electrode 1b, the top wall 1a, the external magnetic electrode 1c and the magnet 2.

Although the magnet 2 is attached only to the outer surface of the central magnetic electrode 1b in this embodiment, a cylindrical magnet may be fixed only to the inner surface of the external magnetic electrode 1c. This magnet may be magnetized in the radial direction and a different pole may be magnetized on a surface thereof opposing to the magnet 2. Further, a magnet can be provided both on the outer surface of the central magnetic electrode 1b and the inner surface of the external magnetic electrode 1c. In this case, the magnetic flux would be further increased and the large thrust can be attained.

In one exemplary embodiment, the bobbin 3 comprises a lightweight non-magnetic material, such as aluminum or resin, and is substantially cylindrical. The cylindrical portion 3a is inserted in a gap formed between the central magnetic electrode 1b and the external magnetic electrode 1c. An axis-aligned portion 3b projects downward from the bottom end portion of the bobbin 3, and is inserted into a guide hole 6a formed in the bottom of the chassis 6. This axis portion 3b can be used as a probe when mounting or inspecting a chip component, or can be used in some other application. The coil 4 is wound cylindrically around the outer perimeter of the cylindrical portion 3a of the bobbin 3, cutting across the above-described magnetic circuit. Current flows through the electromagnetic coil 4 in a direction which generates downward thrust in the moving element B. The axial direction length Lc of the coil 4 is shorter than the axial direction length Lm of the magnet 2. That is, Lc<Lm.

The spring 5 is provided between the chassis 6 and the bobbin 3, and ordinarily applies upward force to the bobbin 3. The characteristics of the spring 5 are set so as to balance the characteristics of the thrust acting on the bobbin 3.

Figure 1:
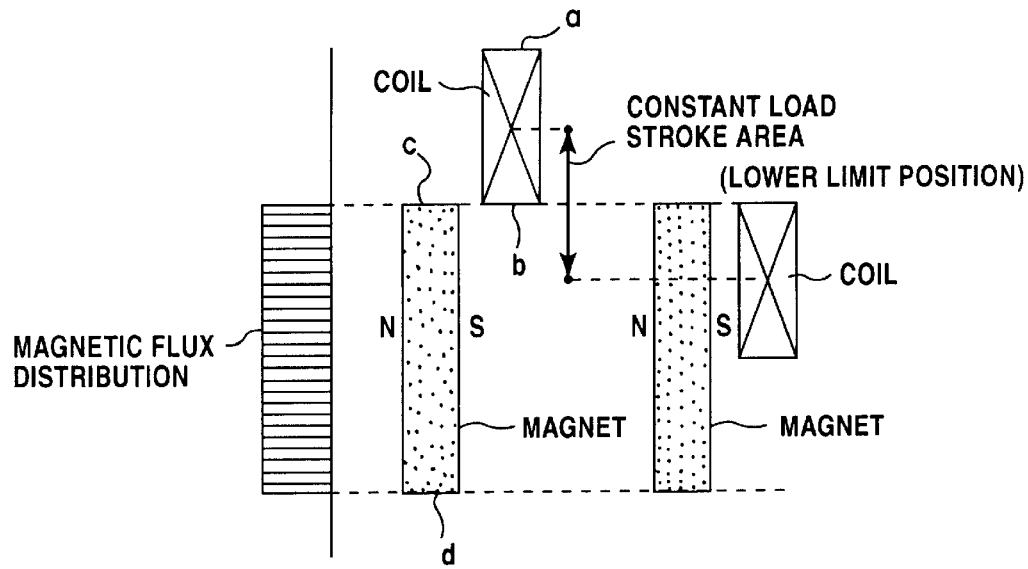
FIG. 1 is an explanation view of an example of the operation principle of a linear actuator of the present invention.
Figure 2:
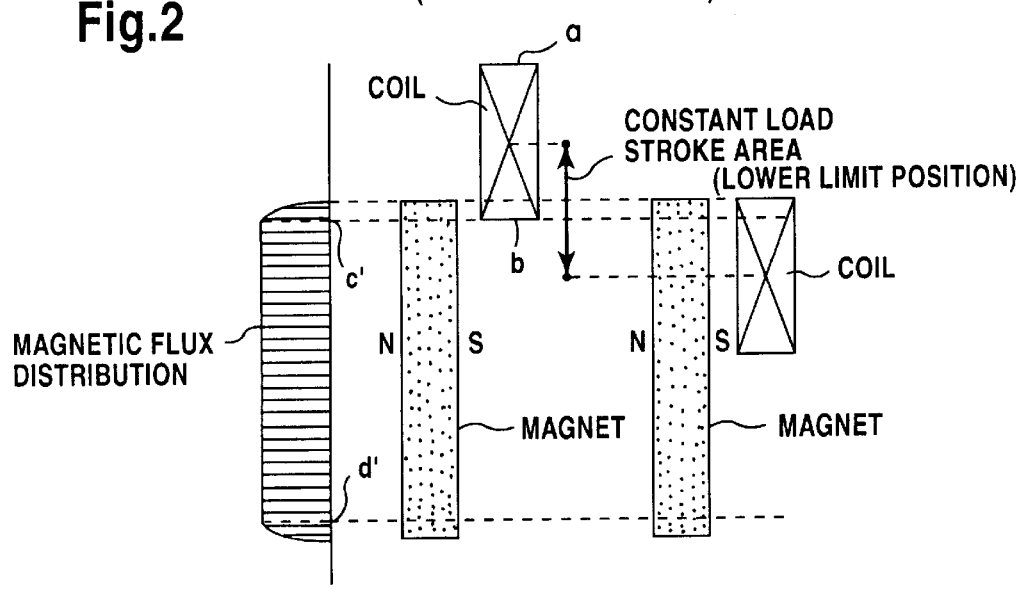
FIG. 2 is an explanation view of another example of the operation principle of a linear actuator of the present invention.
Figure 4:
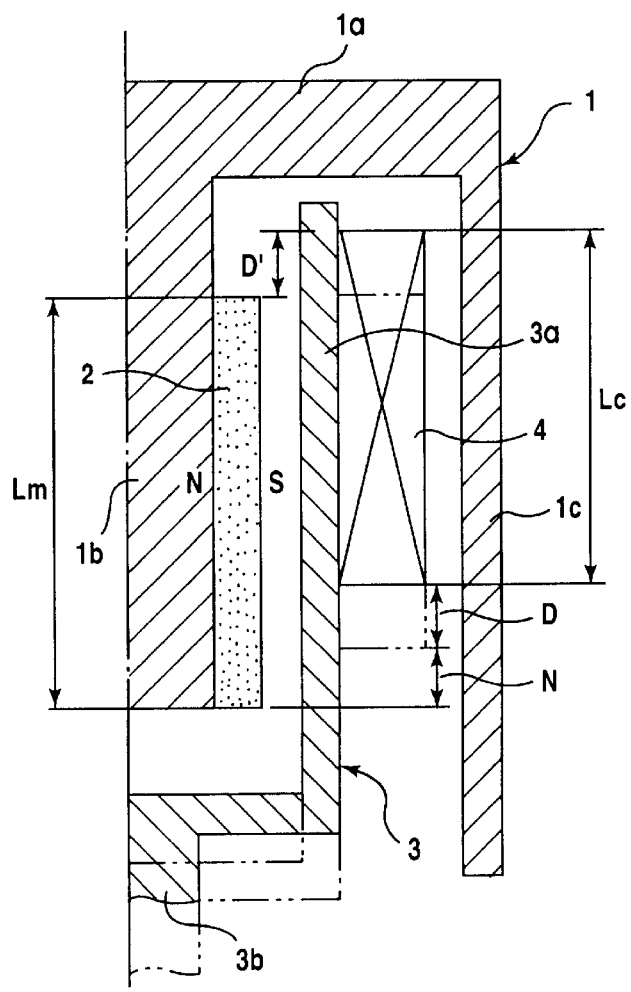
FIG. 4 is a partial enlarged view of FIG. 3.

The solid lines in FIG. 2 show the device in a state when the moving element B is at the upper limit of its stroke, where the top end of the coil 4 is higher than the top end of the magnet 2. The distance D' between the top end of the coil 4 and the top end of the magnet 2 is roughly equal to the movable range D of the moving element B. On the other hand, the bottom end of the coil 4 is higher than the bottom end of the magnet 2 by no less than a predetermined distance. This distance should preferably be roughly equal to the sum of the movable range D of the moving element B and the non-linear range N of the magnetic flux. As a consequence, when the moving element B reaches the lower limit of the stroke (shown in FIG. 4 by dashed lines), the top end of the coil 4 is at roughly the same height as the top end of the magnet 2, and the bottom end of the coil 4 is higher than the bottom end of the magnet 2 by a distance of approximately the non-linear range N.

At the upper limit of the stroke, the distance D' between the top end of the coil 4 and the top end of the magnet 2 may be made greater than the movable range D, and the distance between the bottom end of the coil 4 and the bottom end of the magnet 2 may be made greater than the sum of the movable range D and the nonlinear range N.

Furthermore, it is preferable that the bottom end of the external magnetic electrode 1c extends axially beyond the lower end of central magnetic electrode 1b, since the non-linear range N is thereby relatively decreased, achieving good efficiency.

Figure 5:
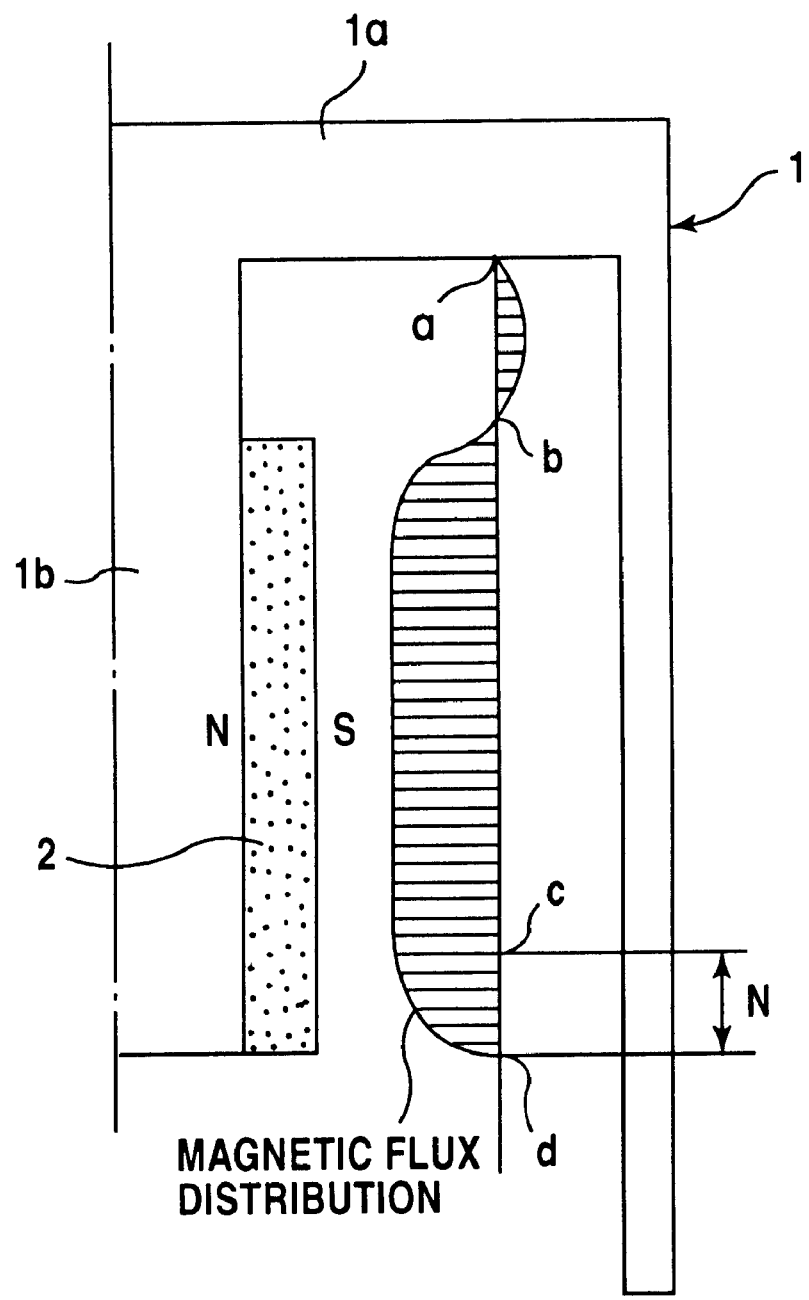
FIG. 5 is a diagram showing magnetic flux distribution of the linear actuator of FIG. 3.

FIG. 5 shows magnetic flux density distribution in the radial direction along the center of the coil 4. As clearly shown in FIG. 3, in the range extending from the bottom face (point a) of the top wall 1a of the yoke 1 to the top end (point b) of the magnet 2, magnetic flux is linear and is directed radially outward. When current is passed through the coil in a predetermined direction, the magnetic flux generates upward thrust in the portion of the coil 4 between point a and point b. The direction of the magnetic flux reverses in a portion slightly higher than the top end (point b) of the magnet 2; that is, the magnetic flux is directed radially inward. When the magnetic flux points radially inward, downward thrust is generated in the portion of the coil 4 below point b. The magnetic flux is constant substantially from an upper end portion (a little below from point b) to a lower end portion of the magnet 2, but the magnetic flux is not constant from point c to a lowest end (point d).

Next, a method for the optimum design of a linear actuator is discussed (that is, a design method for keeping the resultant force of the moving element B constant).

The opposite force $F_1$ which the spring 5 exerts on the moving element B is as follows:

$$F_1 = kx$$

where k is the spring constant, and x is the amount of displacement.

In other words, the opposite force $F_1$ increases in direct proportion to the downward displacement of the moving element B.

On the other hand, the thrust $F_2$ acting on the coil 4 is as follows:

$$F_2 = BIL$$

where B is magnetic flux density, I is coil current, and L is conductive length of coil.

That is, the thrust $F_2$ is directly proportional to the magnetic flux density B. When current is injected through the coil in a predetermined direction, downward thrust $F_2$ is generated in the coil 4.

Therefore, the resultant force F of the moving element B is as follows:

$$F = F_2 + G - F_1$$

where G is the weight of the moving element. The parameters should be set such that this acting force F remains at a fixed value.

Figure 6:
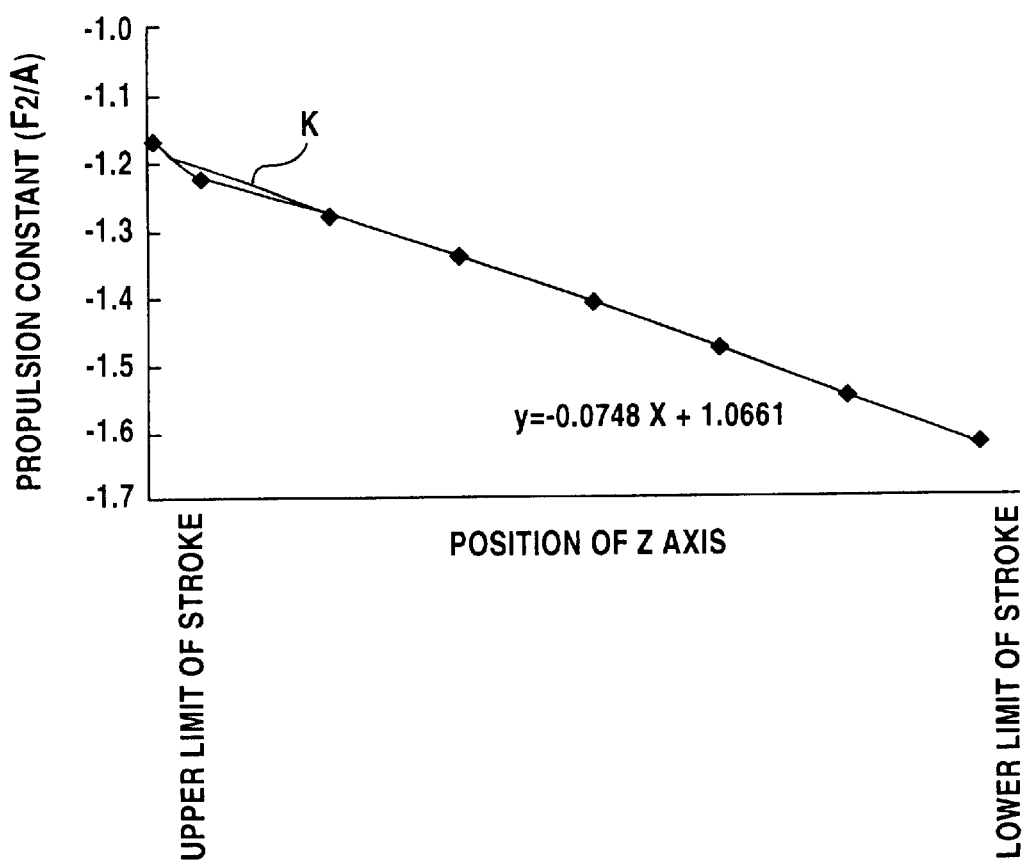
FIG. 6 is a diagram showing changes in thrust constant in the Z-axis direction.

FIG. 6 shows the relation between the position of the top end of the coil 4 and the thrust constant ($F_2/A$). Here, A represents current flow through the coil 4.

As shown clearly in FIG. 6, as the coil 4 moves from the upper limit of the stroke to the lower limit, the thrust (or "propulsion") constant (that is, the thrust per unit of current) increases in roughly direct proportion thereto. As shown in FIG. 5, upward thrust is generated in the portion of the coil 4 between point a and point b, and downward thrust is generated in the portion of the coil 4 between point b and point c. Since the portion of the coil 4 between point a and point b is large when the moving element B is at the upper limit of its stroke, there is less downward thrust. By contrast, the portion of the coil 4 between point a and point b grows shorter as the moving element B moves toward the lower limit of its stroke and the portion between point b and point c grows large, whereby thrust $F_2$ increases by a fixed ratio.

By offsetting the thrust $F_2$, which increases in direct proportion to displacement as described above, against the opposite force $F_1$. of the spring 5, the resultant force F on the moving element B can be kept roughly at a fixed value. More specifically, when the slope of the approximately straight line K of FIG. 6 matches the spring constant k of the spring 5, the resultant force F can be kept at a fixed value.

Figure 7:
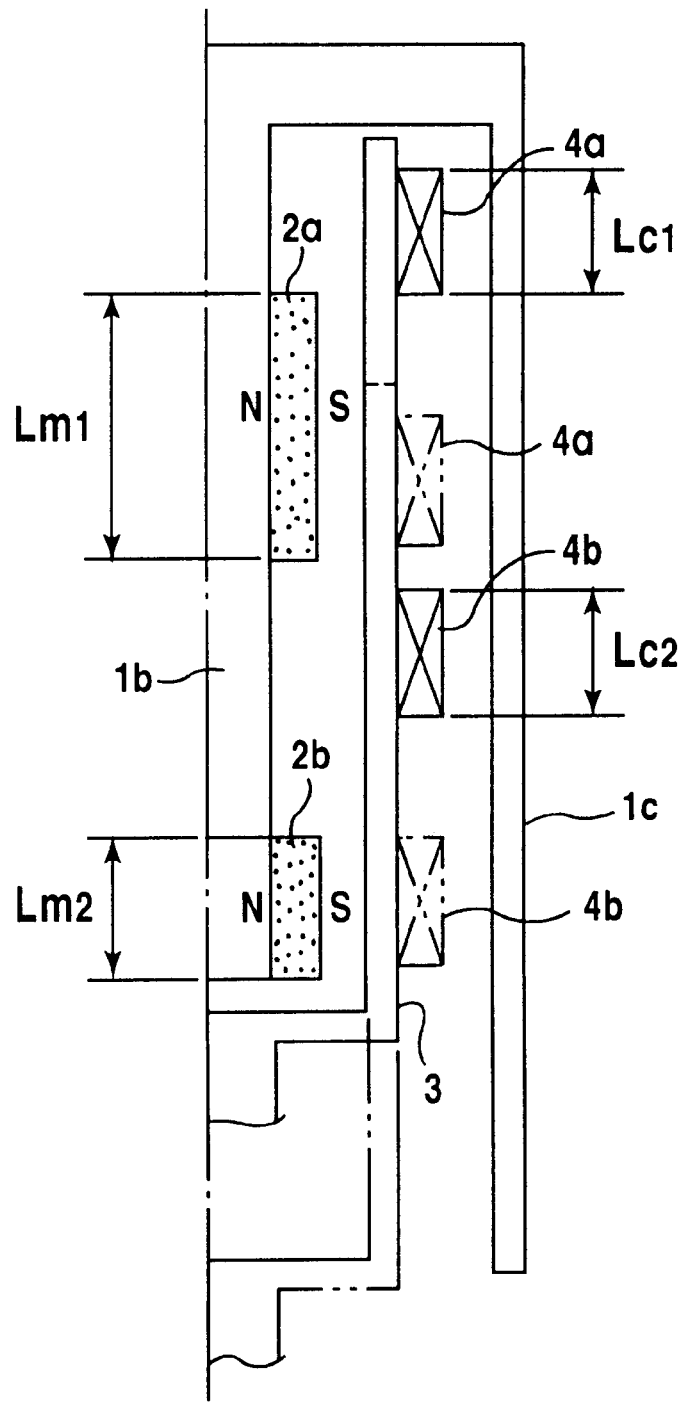
FIG. 7 is a semi-sectional view of the second embodiment of a linear actuator of the present invention.
Figure 8:
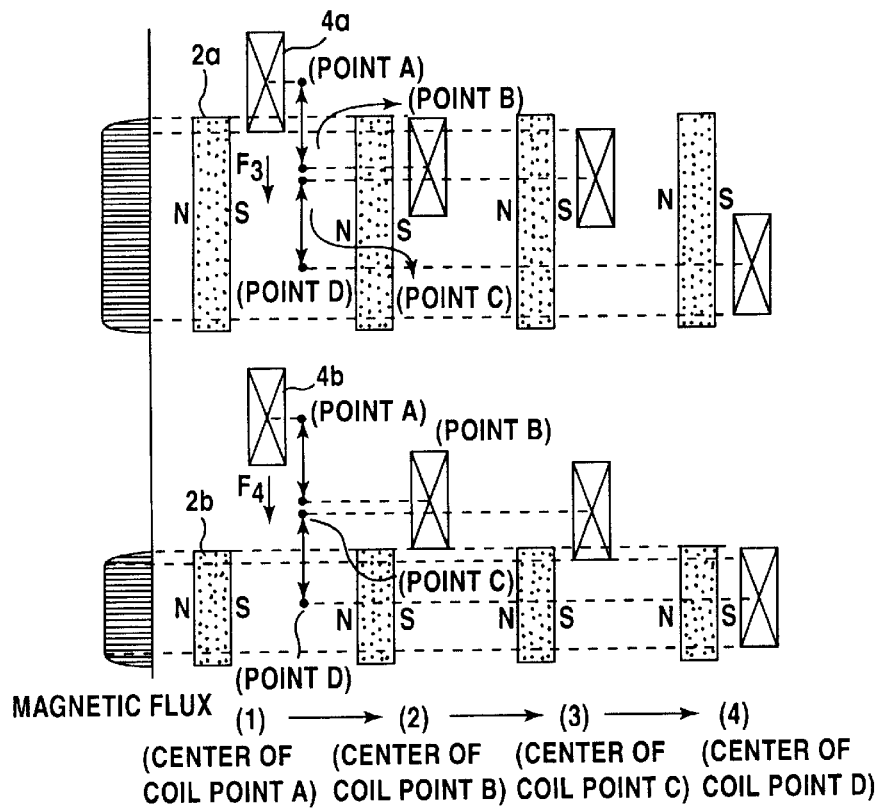
FIG. 8 is an operational explanation view of the linear actuator of FIG. 7.
Figure 9:
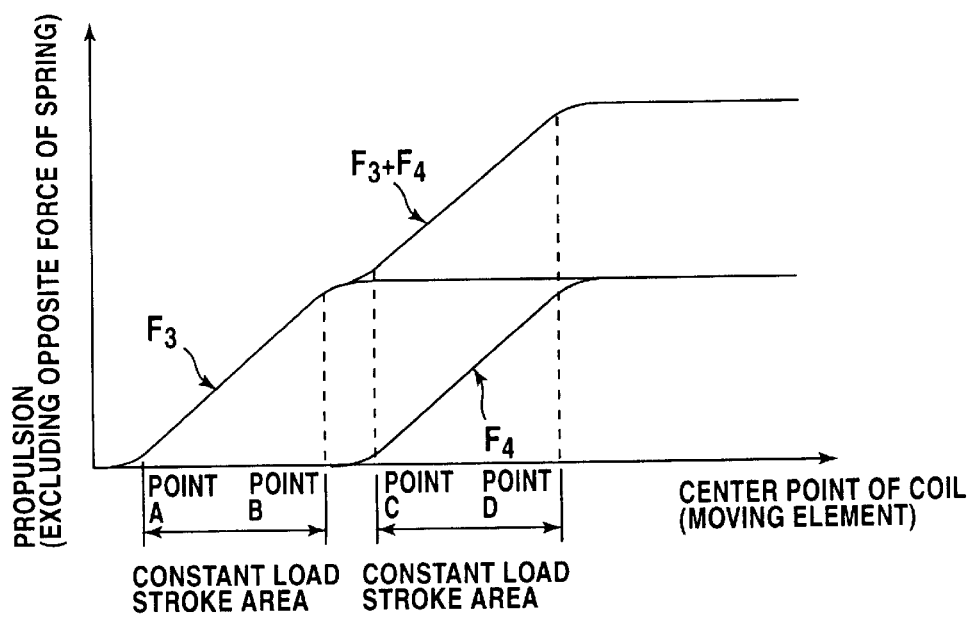
FIG. 9 is a view showing the propulsion characteristic of the linear actuator of FIG. 7.

FIGS. 7 to 9 show a second embodiment of a linear actuator according to the present invention. This embodiment enlarges the constant load stroke area by connecting a plurality of constant load stroke areas. This embodiment has a similar configuration to the first embodiment (see FIG. 4) and differs from the first embodiment in that two magnets 2a, 2b are fixed to a central electrode 1b up and down with an interval therebetween and that two coils 4a, 4b are fixed to a bobbin 3 up and down with an interval therebetween. In addition, the positional relations between magnets 2a, 2b and coils 4a, 4b are set so that the lowest end of the coil 4b comes at the same height as the upper end of the magnet 2b when the upper end of the coil 4b comes at the same height as the upper end of the magnet 2a.

In this embodiment, the length Lc1, Lc2 of the coils 4a, 4b in the stroke direction are identical with each other. The length Lm1 of the magnet 2a in the stroke direction is longer than the length Lm2 of the magnet 2b. Note that the length Lm1 may be identical with the length Lm2. Further, the length Lm2 of the magnet 2b in the stroke direction is identical with the length Lc1, Lc2 of the coils 4a, 4b or the length Lm2 is longer than the length Lc1, Lc2. The length Lm1 of the magnet 2a in the stroke direction is longer than twice the length Lc1, Lc2 of the coils 4a, 4b.

Lc1=Lc2
Lm1≧Lm2≧Lc1
Lm1≧2Lc1

Next, an operation of the linear actuator of the second embodiment is explained in accordance with FIGS. 8 and 9. While a central point of the coil 4a moves between point A and point B of FIG. 8, the upper end of the coil 4a is at the outside of the magnetic flux area of the magnet 2a and the lower end of the coil 4a is within the constant magnetic flux area of the magnet 2a. Thus, a thrust $F_3$ which varies with a constant inclination is generated to the coil 4a. On the other hand, while the coil 4b moves between point A and point B, both ends of the coil 4b are at the outside of the magnetic flux of the magnet 2b . Thus, no trust is generated to the coil 4b. As a result, as shown in FIG. 9, a thrust $F_3$ which increases in proportion is generated to the moving element.

Next, while a central point of the coil 4b moves between point B and point C of FIG. 8, since the upper end of the coil 4b moves within an area where the magnetic flux of the magnet 2a is not constant, the increasing inclination of the thrust $F_3$ becomes dull. Further, since the lower end of the coil 4b also moves within an area where the magnetic flux of the magnet 2b is not constant at that time, a slight thrust $F_4$ is generated to the coil 4b. As a result, the thrust ($F_3+F_4$) applied to the moving element increases slowly.

Next, while a central point of the coil 4a moves between point C and point D of FIG. 8, both ends of the coil 4a move within the constant magnetic flux area of the magnet 2a, thus no thrust $F_3$ is generated. On the contrary, since the lower end of the coil 4b is within the constant magnetic flux area of the magnet 2b and the upper end of the coil 4b is at the outside of the magnetic flux of the magnet 2b, a thrust $F_4$ which increases in proportion is generated to the coil 4b. Therefore, the thrust ($F_3+F_4$) applied to the moving element increases in proportion.

As described above, while the coils 4a, 4b move between point A and point B and between point C and point D, the thrust ($F_3+F_4$) which increases in proportion is generated to the moving element. The constant load stroke area can be enlarged by connecting a plurality of constant load stroke areas, while the inclination of the thrust ($F_3+F_4$) and the spring constant is balanced, and the area between point B and point C is made minimized.

The present invention is not limited to the embodiment described above. For instance, the above embodiment described a linear actuator wherein the fixed element comprises a yoke and a magnet which is magnetized in the radial direction, and wherein the moving element comprises an electromagnetic coil. These elements can be reversed, so that the fixed element comprises an electromagnetic coil and the moving element comprises a yoke and a magnet. However, when a yoke is attached to the moving element, the weight of the moving element is greatly increased. For this reason, the configuration of the above-described embodiment is more preferable, since the moving element can be made lightweight.

The above embodiment described a Z-axis actuator in which the moving element moves upward and downward, but the present invention can also be applied in an actuator which moves horizontally.

A compressed spring was used as an example of a force applying mechanism, but a stretched spring may alternatively be used. When using a stretch spring, the position of the spring is reversed. A spring is not limited to a linear spring, a nonlinear spring may be used in such a case that a thrust characteristic changes nonlinearly. Furthermore, an elastic body, such as rubber, may be used instead of a spring. Moreover, repulsive force may be provided by using magnetic force instead of an elastic body.

Furthermore, a guide rail or the like can be provided in order to improve linearity in the movement direction of the moving element B.

Magnets are not limited to a cylindrical magnet in the embodiments. A planar magnet or a stick-like magnet can be used. Similarly, coils are not limited to a cylindrical coil whose central axis is parallel to the moving direction.

As is clear from the above explanation, the present invention comprises means for applying force in the opposite direction to the direction of the thrust acting on the moving element. Further, balance is achieved between the characteristics of the opposite force of the force applying means and the characteristics of the thrust acting on the moving element in at least a portion of the stroke area of the moving element a load toward an outside within a determined stroke area can be substantially constant.

Furthermore, even if power is switched off, the action of the force applying means is able to keep the actuator in a predetermined place, avoiding problems of safety and product quality. Moreover, even when the actuator remains stationary on standby for a long time, a fixed position can be maintained with no current flow into the coil. Further, generation of heat in the actuator can be prevented, thereby eliminating problems of performance and life span.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A linear actuator, comprising:
   a fixed element located at a fixed position;
   a moving element provided movable in the straight line direction;
   a coil provided with one of said fixed element and the moving element;
   a magnet provided with the other of said fixed element and the moving element, said magnet generating magnetic flux in a vertical direction to the coil; and
   means for applying opposing force to a thrusting force applied to the moving element, said means having a predetermined reaction characteristic in the stroke direction of the moving element;
   wherein a constant load stroke area is provided in at least a part of stroke area of the moving element so that the reaction characteristic of the means and the thrusting force applied to the moving element are balanced; and
   wherein said constant load stroke area is an area where one end of the coil in the stroke direction is located in an outside position from one end of the magnet in the stroke direction and the other end of the coil in the stroke direction is located in an outside position from both ends of the magnet in the stroke direction.

2. A linear actuator according to claim 1, wherein said magnet is a cylindrical magnet magnetized in a radial direction defined by a yoke, said coil is a cylindrical coil located in a concentric circle at inner peripheral side or at outer peripheral side of the magnet, said moving element is movable in the axial direction of the cylindrical magnet.

3. A linear actuator according to claim 2, wherein said constant load stroke area is an area where one end of the coil in the stroke direction is located in an outside position from one end of the magnet in the stroke direction and the other end of the coil in the stroke direction is located in an outside position from both ends of the magnet in the stroke direction.

4. A linear actuator according to claim 1, wherein said constant load stroke area is an area where one end of the coil is located in an outside area of the magnetic flux of the magnet and the other end of the coil is located within a substantially constant area of the magnetic flux of the magnet.

5. A linear actuator according to claim 2, wherein said constant load stroke area is an area where one end of the coil is located in an outside area of the magnetic flux of the magnet and the other end of the coil is located within a substantially constant area of the magnetic flux of the magnet.

6. A linear actuator according to claim 1, wherein said coil includes a first coil and a second coil and said magnet includes a first magnet and a second magnet, said first and second magnets generating a magnetic flux vertically to the first and the second coils, respectively;

characterized in that said first coil and said second coil, and said first magnet and said second magnet are connected to each other in the stroke direction with a predetermined interval therebetween, so that when one end of the first coil in the stroke direction is in the outside position from one end of the first magnet in the stroke direction and the other end of the first coil in the stroke direction is in the inside position from both ends of the first magnet in the stroke direction, both ends of the second coil in the stroke direction are at the outside position from both ends of the second magnet in the stroke direction, and that when both ends of the first coil in the stroke direction are at the inside position from both ends of the first magnet in the stroke direction, one end of the second coil in the stroke direction is at the outside position from one end of the second magnet in the stroke direction and the other end of the second coil is at the inside position from both ends of the second magnet in the stroke direction.

7. A linear actuator according to claim 2, wherein said coil includes a first coil and a second coil and said magnet includes a first magnet and a second magnet, said first and second magnets generating a magnetic flux vertically to the first and the second coils, respectively;

characterized in that said first coil and said second coil, and said first magnet and said second magnet are connected to each other in the stroke direction with a predetermined interval therebetween, so that when one end of the first coil in the stroke direction is in the outside position from one end of the first magnet in the stroke direction and the other end of the first coil in the stroke direction is in the inside position from both ends of the first magnet in the stroke direction, both ends of the second coil in the stroke direction are at the outside position from both ends of the second magnet in the stroke direction, and that when both ends of the first coil in the stroke direction are at the inside position from both ends of the first magnet in the stroke direction, one end of the second coil in the stroke direction is at the outside position from one end of the second magnet in the stroke direction and the other end of the second coil is at the inside position from both ends of the second magnet in the stroke direction.

8. A linear actuator according to claim 1, wherein said coil includes a first coil and a second coil and said magnet includes a first magnet and a second magnet, said first and second magnets generating a magnetic flux vertically to the first and second coils, respectively;

characterized in that said first coil and said second coil, and said first magnet and said second magnet are connected to each other in the stroke direction with a predetermined interval therebetween, so that when one end of the first coil in the stroke direction is at the outside area of the magnetic flux of the first magnet and the other end of the first coil is within a substantially constant magnetic flux area of the second magnet, one end of the second coil is at the outside area of the magnetic flux of the second coil and the other end of the second coil is within a substantially constant magnetic flux area of the second magnet.

9. A linear actuator according to claim 2, wherein said coil includes a first coil and a second coil and said magnet includes a first magnet and a second magnet, said first and second magnets generating a magnetic flux vertically to the first and second coils, respectively;

characterized in that said first coil and said second coil, and said first magnet and said second magnet are connected to each other in the stroke direction with a predetermined interval therebetween, so that when one end of the first coil in the stroke direction is at the outside area of the magnetic flux of the first magnet and the other end of the first coil is within a substantially constant magnetic flux area of the second magnet, one end of the second coil is at the outside area of the magnetic flux of the second coil and the other end of the second coil is within a substantially constant magnetic flux area of the second magnet.

10. A linear actuator according to claim 1, wherein an amount of the magnetic flux passing through said coil varies in relation to a position of the coil relative to the magnet producing a variance in said thrusting force which is offset by the means for applying opposing force.

11. A linear actuator comprising:

a chassis;

a probe element which passes through a guide hole formed in said chassis;

a magnet which produces lines of magnetic flux;

a coil element disposed vertically to at least a portion of said lines of magnetic flux so that said at least a portion of lines of magnetic flux pass through said coil element, the coil element extending beyond said magnet in a direction horizontal to said at least a portion of lines of magnetic flux; and a force applying mechanism which provides a balancing force in a direction opposite to the direction of a thrust force produced between said magnet and said coil.

12. A linear actuator according to claim 11, wherein said balancing force produces a constant load stroke area.

* * * * *